US009838146B2

(12) United States Patent

Chavez et al.

(10) Patent No.: US 9,838,146 B2
(45) Date of Patent: Dec. 5, 2017

(54) APPARATUS FOR LABELING INPUTS OF AN AUDIO MIXING CONSOLE SYSTEM

(71) Applicant: Harman International Industries, Inc., Stamford, CT (US)

(72) Inventors: Paul Michael Chavez, Chatsworth, CA (US); Adam James Edward Holladay, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/931,337

(22) Filed: Nov. 3, 2015

(65) Prior Publication Data

US 2016/0127062 A1 May 5, 2016

Related U.S. Application Data

(60) Provisional application No. 62/075,441, filed on Nov. 5, 2014.

(51) Int. Cl.
*H04B 1/00* (2006.01)
*H04H 60/04* (2008.01)
*H04R 3/00* (2006.01)

(52) U.S. Cl.
CPC ............... *H04H 60/04* (2013.01); *H04R 3/00* (2013.01)

(58) Field of Classification Search
CPC ................................ H04R 3/00; H04H 60/04
USPC ........................................................ 381/119
See application file for complete search history.

(56) References Cited

U.S. PATENT DOCUMENTS 5,608,807 A 3/1997 Brunelle
2010/0290638 A1* 11/2010 Heineman .............. H04H 60/04 381/77
2014/0241538 A1* 8/2014 Ayres ....................... G10H 7/00 381/61

FOREIGN PATENT DOCUMENTS

EP 2770498 A1 8/2014

OTHER PUBLICATIONS

Extended European Search Report from corresponding European Application No. 15192718.3, dated Mar. 29, 2016.
U.S. Patent and Trademark Office mailed Office Action dated Jun. 30, 2016, for related U.S. Application No. 14/533,442.
Partial European Search Report from related European Application No. 15192717.5, dated Mar. 18, 2016.

* cited by examiner

*Primary Examiner* — Paul S Kim
(74) *Attorney, Agent, or Firm* — Brooks Kushman, P.C.

(57) ABSTRACT

An apparatus for labeling inputs at an audio mixer is provided. The apparatus includes an audio mixer console including a processor and being configured to receive a test command from a mobile device. The audio mixer console is further configured to transmit, from a port, an audio signal to a playback device, the port being associated with a channel of the audio mixing console, and receive, from the mobile device, a label signal including a channel label to be assigned to the channel from the mobile device in response to a user input. The audio mixer console is further configured to assign the channel label to the channel in response to the label signal.

17 Claims, 7 Drawing Sheets

APPARATUS FOR LABELING INPUTS OF AN AUDIO MIXING CONSOLE SYSTEM

CROSS-REFERENCE TO RELATED APPLICATIONS

This application claims the benefit of U.S. provisional application No. 62/075,441 filed Nov. 5, 2014, the disclosure of which is hereby incorporated in its entirety by reference herein.

TECHNICAL FIELD

Embodiments disclosed herein generally relate to an apparatus for labeling inputs of an audio mixing console or audio mixer.

BACKGROUND

Audio mixing consoles are often used for combining, routing and altering the dynamics of audio signals. A mixing console may receive several audio signals (e.g., vocals, guitar, drums, keyboard, etc.) across various channels at inputs corresponding to each. Often wires are used to connect various microphones to the mixing console. Each of these wires is connected to a separate input port of the console and a channel is associated with each. Each channel may be associated with various controls on the mixing console so that the audio signal on the channel may be modified by a user. Thus, the user may wish to know which controls are associated with each input and labeling each channel is important for effectively managing the incoming audio signals. However, labeling each input may often be a cumbersome task. For example, associating a certain input port and channel with the microphone attached thereto may require the user to create a handwritten list and input that list using the console's labeling software. Additionally, two users may communicate with each other as the wires are plugged into the console. However, these are often tedious and inefficient methods for labeling console channels.

SUMMARY

An apparatus for labeling inputs at an audio mixer is provided. The apparatus includes an audio mixer console including a processor and being configured to receive a test command from a mobile device. The audio mixer console is further configured to transmit, from a port, an audio signal to a playback device, the port being associated with a channel of the audio mixing console, and receive, from the mobile device, a label signal including a channel label to be assigned to the channel from the mobile device in response to a user input. The audio mixer console is further configured to assign the channel label to the channel in response to the label signal.

A computer-program product embodied in a non-transitory computer-readable medium programmed for labeling inputs of an audio mixer and configured to provide instructions for electrically receiving a first user input that indicates a command for an audio mixing console to enter into a label mode that enables a channel on the audio mixing console to be associated with a label. The instructions also include transmitting a mode command to the audio mixing console in response to the first user input and selectively receiving a second user input that identifies the label to be assigned to the channel on the audio mixing console. The instructions further include transmitting a label message that identifies the label to be assigned to the channel to the audio mixing console in response to the second user input.

An apparatus for labeling inputs at an audio mixer is provided. The apparatus includes a mobile device including a processor. The mobile device is programmed to electrically receive a first user input that indicates a command for an audio mixing console to enter into a label mode that enables a channel on the audio mixing console to be associated with a label. The mobile device is also programmed to transmit a mode command to the audio mixing console in response to the first user input and to receive a second user input that identifies the label to be assigned to the channel on the audio mixing console. The mobile device is further programmed to transmit a label message that identifies the label to be assigned to the channel.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
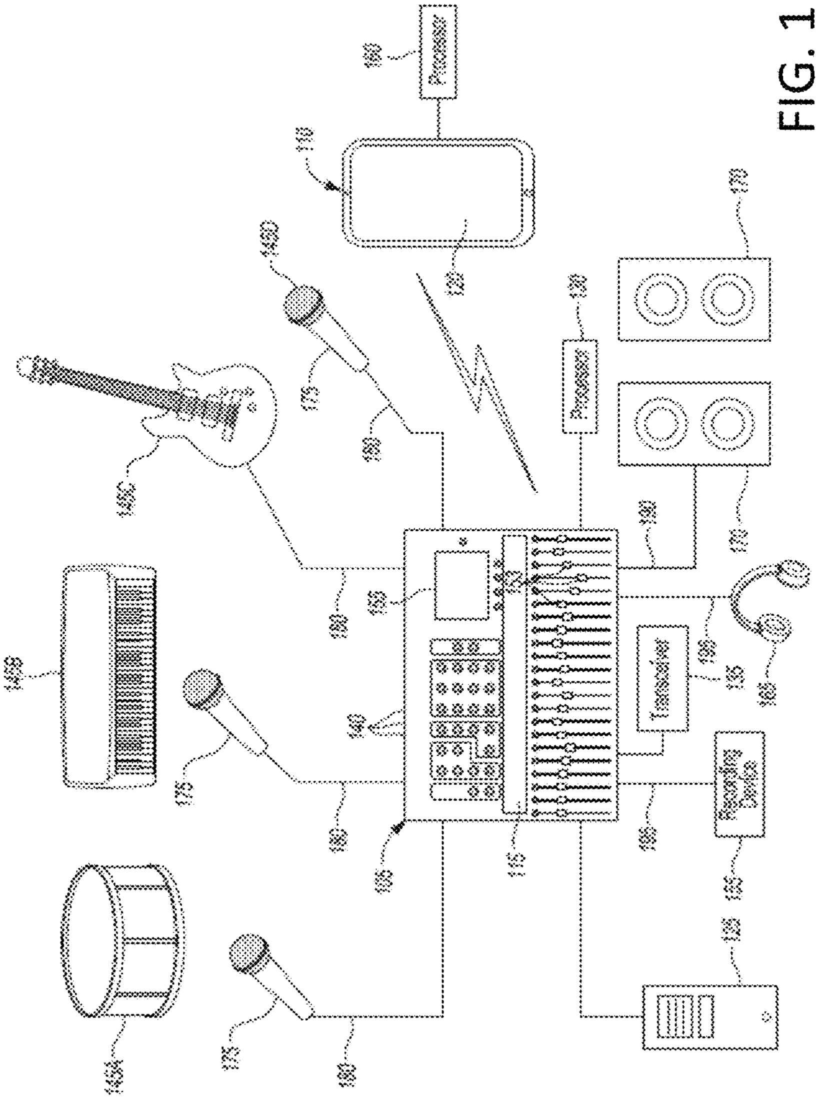
FIG. 1 is a diagram for an audio mixing console labeling system.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Described herein is an audio mixing console configured to interface with a remote mobile user device to label various audio inputs of the console. A user remote from the mixing console may use the remote device to remotely label the inputs. The console may receive at least one signal identifying the channel and the label to be associated with it. In some examples, a wireless label signal from the mobile device and an audio signal from a microphone associated with an instrument will be received at the console. The label signal may identify a label and the audio signal may identify the channel. The console may associate the label with the channel to automatically display the label with the associated channel.

Typically, consoles may be labeled manually by two people, one at the mixing console and one at the instrument, to communicate with each other as the inputs are plugged into the console. Additionally, a single person may create a written list and input that list using the mixing console's labeling software, which is often not designed for simple text entry. By using a remote mobile device to automatically label the console channels, the need for a two person process, or written list, is eliminated. Thus, a more reliable and efficient process may be achieved. Further, greater flexibility may be realized at least because custom labels may be generated, saved, and reused using the remote mobile device.

Figure 2:
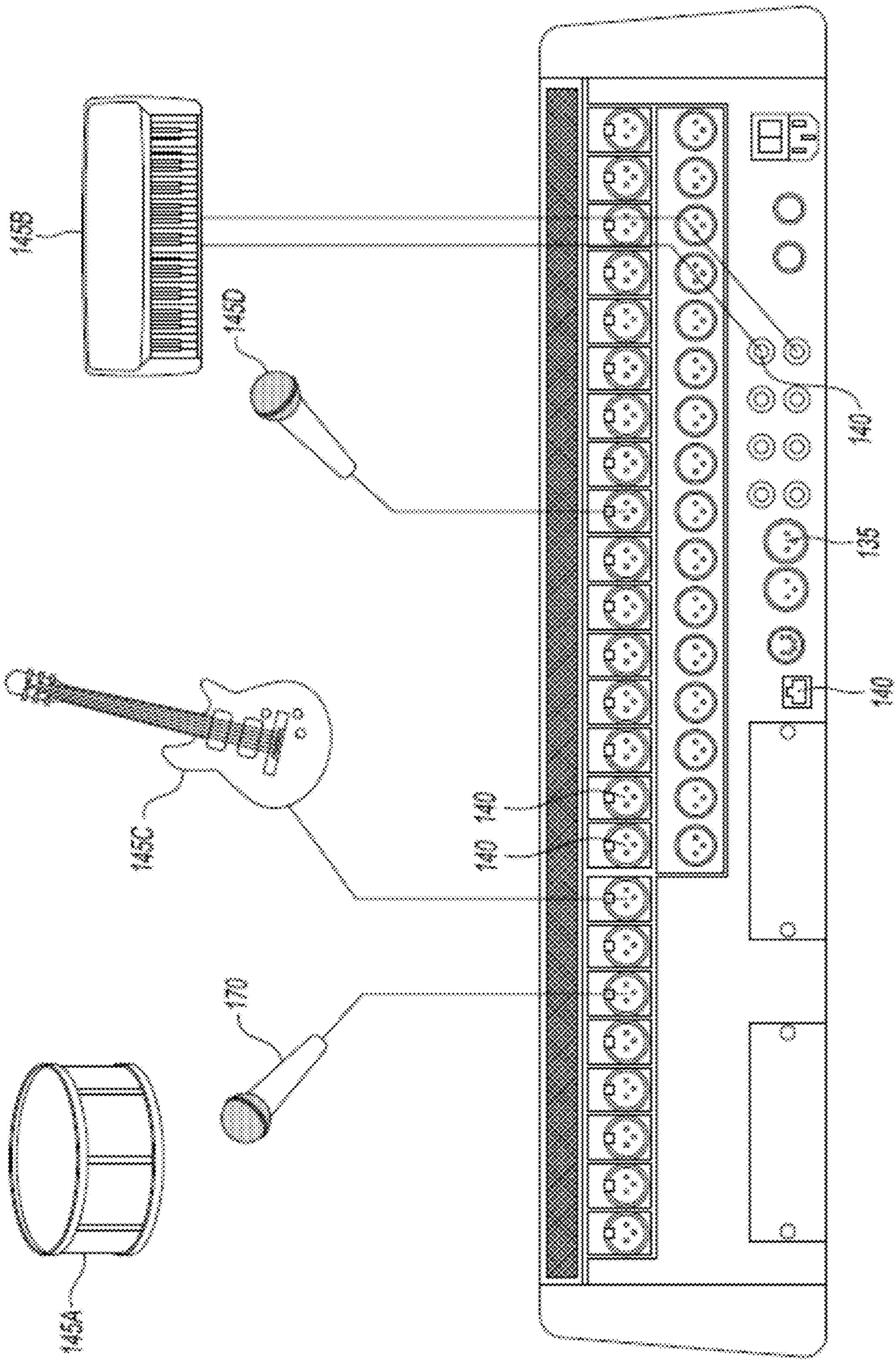
FIG. 2 is a portion of the audio mixing console of the console labeling system.

FIG. 1 is a console diagram for a console labeling system 100. The system 100 may include an audio mixing console 105 (or audio mixer) and a mobile user device 110. The console 105 and the mobile device 110 may communicate with one another via a wireless network such as Wi-Fi®, Bluetooth®, ZigBee, cellular networks, ad-hoc wireless networks, etc. The console 105 may be an audio mixer, a sound board or a mixer contained within a PC as part of a stand-alone mix application or a digital audio workstation mixer. While the console 105 is shown as a mixing console 105 separate from a computing device 125, the console 105 may include the computing device 125. The console 105 is configured to combine various incoming audio signals. The console 105 may further be configured to alter the dynamics of the incoming and outgoing signals for an audio recording system within a recording studio. The mixing console 105 may include a plurality of ports 140 (as shown in FIG. 2 and also referred to herein as input ports 140). These ports 140 may provide input signals from various instrument devices 145.

The mixing console 105 may also include a transceiver 135 (or wireless access point) for receiving wirelessly transmitted signals. The mobile device 110 is configured to transmit the signal to the console 105. The console 105 may also include a transmitter (not shown) for transmitting signals back to the mobile device 110. The console 105 may include a processor 130 to execute a number of functions associated with the console 105 disclosed herein. The processor 130 may be configured to analyze the incoming signals. The processor 130 may also instruct the transmitter to transmit certain data and messages.

Although not shown, a proxy device, such as a proxy server, may be used to receive and transmit signals between the console 105 and the mobile device 110. The proxy device may be connected to the console 105 and the mobile device 110 via a wired or wireless connection (e.g., wireless network such as Wi-Fi®, Bluetooth®, ZigBee, cellular networks, ad-hoc wireless networks, etc.).

The mixing console 105 may have a console display 155. The console display 155 may be an electronic visual display for displaying relevant interfaces to a user of the console 105. The display 155 may be a touchscreen and respond to various user inputs such as to a user's finger, stylus, etc. As noted above, the display 155 may also be a liquid crystal display (LCD), plasma panel, light emitting diode (LED) display, etc. The display 155 may display information and facilitate the use of the console 105 by users. An example display 155 and interface will be discussed in detail below with respect to FIG. 3.

Additionally or alternatively, the mixing console 105 may have a display strip 115. The display strip, similar to the console display 155, may be an electronic visual display. The display strip 115 may be arranged above faders 153 on the console 105 and may be configured to display labels for each of the channels associated with the faders 153. For example, a separate textual label may be associated with each of the faders 153 to allow for easy identification of the fader controls.

The mobile device 110 may be a portable device such as a mobile phone, tablet, personal digital assistant, e-reader, laptop computer, SmartWatch, etc. The mobile device 110 may include a processor 150 and database (not shown). The processor 150 is generally configured to execute a number of the functions associated with the mobile device 110 as disclosed herein. The mobile device 110 may be configured to transmit signals wirelessly to the console 105. The mobile device 110 may also be configured to generate and transmit audible or audio based information via a device speaker. One or more microphones 175 may be generally coupled to the console 105 and may receive the emitted audio from the mobile device 110. The emitted audio sounds may include encoded signals identifying alphanumeric characters which indicate label information to the console 105. An example signal may include a frequency-shift keying (FSK) signal. The encoded signal, once received from the microphone 175 and decoded at the processor 130, may represent the label (e.g., "guitar", "bass", "vocal", etc.) to be associated with the input. The emitted sounds may also include non-coded audio signals which also indicate label information to the console 105. These audio signals may be emitted when the mobile device 110 is within a predetermined distance from the microphone 175. A non-coded signal may be a unique tone such as, for example, a 520 Hz sine wave.

The processor 150 of the mobile device 110 may be configured to execute instructions to emit the encoded audio signals via the mobile device 110 on the emitted audio sounds. The processor 150 may also instruct a transmitter within the device 110 to transmit various label signals to the console 105 over a wireless network. The mobile device 110 may provide a user interface 185 via a display 120 to facilitate labeling the console channels (or inputs 140). An example of interface 185 is discussed below with respect to FIG. 4. A user may remotely label the console channels 140 via the interface 185, which allows the user to input various textual labels, as well as select labels from a list of predefined or previously saved labels within memory of the user interface 185. The information exchange between the mobile device 110 and the console 105 create an easy, efficient, and customizable labeling system.

A computing device 125 may be in communication with the console 105 via a wireless or hardwired connection. The computing device 125 may include a processor (not shown) and be configured to facilitate sound recording including the adjustment of channels in the console 105. At least one monitor 170 (or speaker 170) may also be in communication with the console 105. The monitor 170 may be a speaker for audibly generating the mixed audio signal by the console 105. Based on the sound emitted from the monitor 170, a user may adjust the audio signal using the console 105 accordingly. Although not shown, additional devices such as amplifiers may be in communication with the monitor 170.

As noted above, any number of microphones 175 (or sensors) may be in communication with the console 105. A wire 180 may electrically couple each microphone 175 to the ports 140 (as shown in FIG. 2) of the console 105. The microphones 175 may be positioned near a corresponding instrument device 145*a*, 145*b*, 145*c*, 145*d* ("145") to receive an audio output from the instrument device 145. Each microphone 175 may transmit a signal representing the audio output from the instrument device 145 to the console 105. At least one of the microphones 175 may be arranged to receive a vocal input signal from a vocalist. In one example, the microphone 175 may be positioned next to an amplifier of an instrument such as an electric guitar. In another example, the electric guitar may include a microphone 175 within or on the guitar. In another example, the electric guitar may be coupled directly to an input port 140 to provide the audio input to the console 105. In this case, a separate microphone is not necessary to transmit audio signals from the guitar to the console 105 (see instrument device 145*c*.)

In an implementation that differs from the one described above to label the ports 140 of the console 105, each microphone 175 may receive and/or transmit a label signal to provide information related to the label for the corresponding input port 140 to the console 105. The label signal may be provided to the microphone 175 from the mobile device 110 prior to the microphone 175 transmitting an audio signal to the console 105. For example, each microphone 175 may include an integrated microphone identification circuit. The circuit may include a receiver for receiving wireless signals from the mobile device 110. The receiver of the microphone 175 may receive a message indicating a label (i.e., label signal) to be associated with the channel for which the microphone is connected. That is, instead of the mobile device 110 wirelessly transmitting the label to the console 105, the label may be transmitted directly from the microphone 175. Additionally, the circuit may be configured to transmit an identification tone to the console 105. The console 105 may receive an encoded tone and identify the channel it was received on. The console 105 may also decode the tone to retrieve the textual label that is to be associated with the channel. Additionally or alternatively, the microphone 175 may include a built-in circuit having a switch (e.g., radio frequency switch) that when pressed or flipped, may cause an identification tone (i.e., audio signal) to be sent to the console 105 via the wire 180. This tone may identify the microphone model and the channel to which it is connected. The mobile device 110 may then transmit the label signal to the microphone circuit or transmit the label signal directly to the console 105.

Additionally or alternatively, the console 105 may interpret the received audio signal. For example, the audio signal may include an identification tone, or the audio signal may include a tone indicative of the instrument device 145 associated with the microphone (e.g., the signal may represent a drum snare). The console 105 may be capable of recognizing the audio signal as that of a drum snare and may in turn associate the appropriate label (e.g., "Drums").

The instrument devices 145*a-d* may include various instruments for recording music. In the examples shown, a drum 145*a*, keyboard 145*b*, guitar 145*c* and microphone 145*d* may be included. Other instruments or sound emitting devices may also be included. These may include percussion instruments (e.g., xylophone, triangle, wood blocks, clapping sticks, etc.); wind instruments (e.g., accordion, horns, bassoon, clarinet, harmonica, organ, saxophone, trumpet, etc.); or string instruments (e.g., banjo, violin, cello, guitars, harp, etc.). The instrument devices 145 may be configured to emit a sound which may be picked up by the associated microphone 175. The microphone 145*d* may be defined or the associated microphone 175 in the—a singer provides a vocal input to the microphone 145*d*. As explained, the microphone 175 may then transmit an electronic signal representing that sound to the console 105. The microphones 175 may be in communication via a cord or wire 180. The wire 180, as explained, may be connected to the console 105 at an input port 140.

FIG. 2 is an example portion of the console 105 of the labeling system 100. The plurality of ports 140 may be generally located at a rear portion of the mixing console 105 and may include input and output ports. Each port 140 may be capable of receiving the wire or cord 180 by receiving information from a respective microphone 175. The ports 140 may include various socket types; such as; for example, XLR sockets. In one example a 6.5 mm Jack may be configured to receive a plug from an electric guitar or other audio device. Other types of ports 140 may include RCA sockets, among others. As explained above, an action at the instrument device 145 may create an electronic signal to be delivered via the wire 180 to the console 105 via the respective input port 140. These actions could include a tap on the microphone or a created noise (e.g., simulated sound from the mobile device 110, noise from the associated instrument device 145, etc.). While FIG. 1 shows that these actions may be recognized at the microphone 175, the instrument device 145 may be directly connected via the wire 180 with the console 105 (e.g., an electric guitar 145*c*, disc player, effect units, etc.) Furthermore, other playback devices and output devices such as speakers 170 may be connected to the console via the ports 140.

In operation, a user associated with the mobile device 110 may select a label via the display 120 of the mobile device 110. For example, if the user wishes to label the channel connected to the microphone 175 associated with the drum 145*a*, the user may select "Drum" from a list of potential labels. An example user interface 185 will be described below in more detail with respect to FIG. 4. In general, once the label is selected, the label may be transmitted to the console 105. Concurrently, or near concurrently, the channel to be labeled may be identified when an audio signal is received at the input port 140 associated therewith. The specific examples of the manner in which the label signal is transmitted and the manner in which the audio signal identifying the channel is transmitted are described in more detail below with respect to FIGS. 5-8.

Once the audio signal is transmitted to the input port 140, the console 105 may identify the channel associated with the input port. The console 105 may associate the received label signal with the identified channel and label the channel accordingly. The label may be displayed on the console display 155 or on a label strip. In one example, the label signal may be transmitted by the mobile device 110 and the audio signal may be transmitted by the microphone 175. That is, the console 105 may associate a first signal received from the microphone 175 with a second signal received from the device 110 to label the channels of the console 105.

Figure 3:
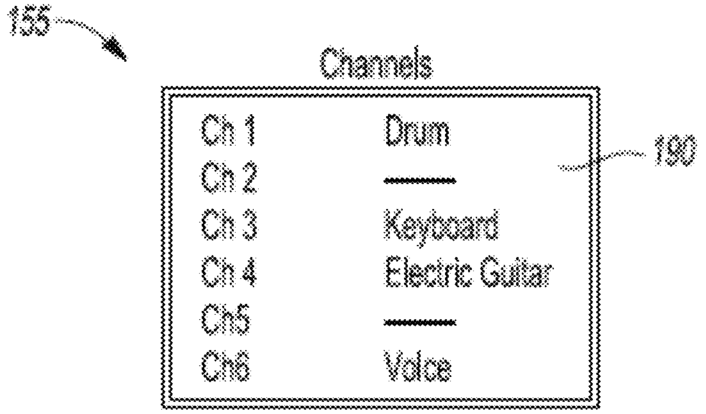
FIG. 3 is a display for the console mixer of the console labeling system.

FIG. 3 is an example of the display 155 and the interface 190 for the console 105. The display 155, as explained, may be configured to show various interfaces for facilitating the use of the console 105. The interfaces may include information and data surrounding the mixing of audio signals. In addition, the interfaces may display information about the input channels of the console 105. In addition, the labels may be displayed via an electronic label strip. In the example interface 190 shown in FIG. 3, various channels may be associated and labeled with the respective instrument device 145. For example, channel 1 (CH1) may be associated with drums and therefore may be labeled "Drum". Other channels may be labeled accordingly, e.g., "Keyboard," "Electric guitar" and "Voice." This may help the user maintain labels for each channel and each input port 140. By permitting an interface 190 to display such information, the need for traditional, hand written label strips may be avoided. Further, a more accurate and efficient method may be used to update and change the labels.

Figure 4:
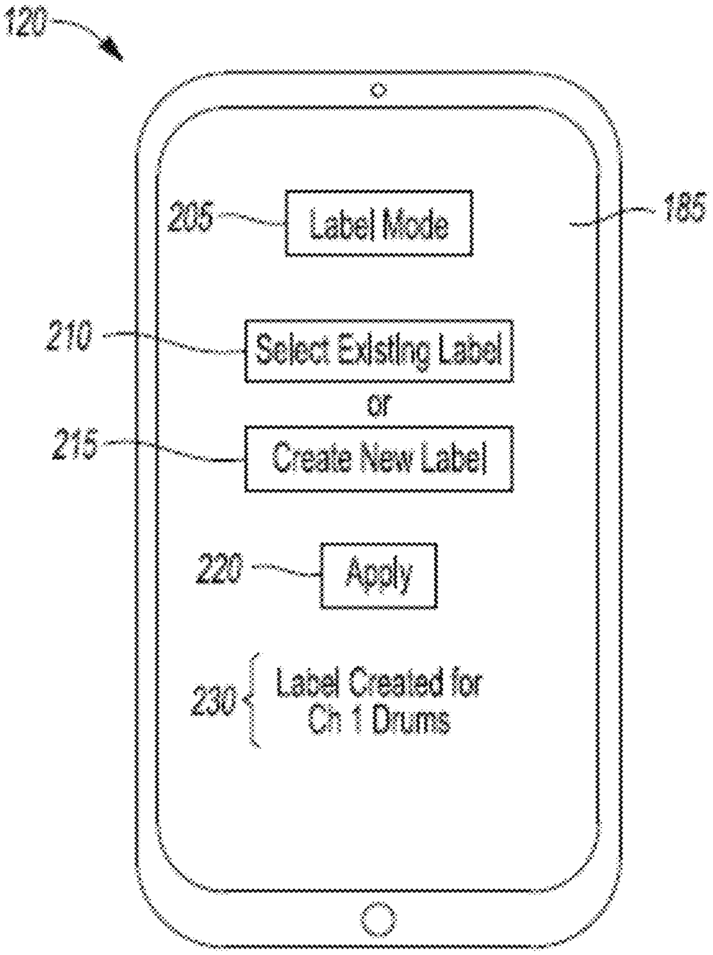
FIG. 4 is a display for a mobile device of the console labeling system.

FIG. 4 is an example display 120 and interface 185 for the mobile device 110. The interface 185 may have a label mode button 205 that, when selected, may instruct the mobile device 110 to transmit a message instructing the console 105 to enter a label mode. In this mode, the console 105 may be configured to receive label signals from the mobile device 110 and audio label signals from the instrument devices 145. In the label mode, each of the channels may be active. That is, the instructions may ready the console 105 for receiving and processing the received labels for the channels. Once the console 105 exits the label mode, the console 105 may return to a normal mode during which the console 105 may mix audio inputs that are received at the mixing console 105. While in the normal mode, the console 105 may restore the previously set input gains to each channel. In general, the console 105, while in the label mode, is prevented from mixing any number of audio inputs that are received. The console 105 resumes mixing the audio inputs in the normal mode. The mobile device 110 may transmit a signal to the console 105 to exit from the label mode and into the normal mode. The console 105 may also change the gain on each of the channels so that each channel may sense an incoming audio signal in the normal mode.

The interface 185 may also provide various labeling options for user selection. An existing label block 210 may present a drop down menu listing various pre-selected labels for user selection. A create new label block 215 may present a text block for textual entry by a user of a new label (e.g., one currently not on the existing label list). An apply button 220, may apply the label to the selected channel. Upon selection of the apply button 220, the selected label may be transmitted to the console 105 via the wire 180 connected to the microphone 175 and/or the wireless network. For example, upon selecting the apply button 220, the mobile device 110 may emit an encoded sound signal as noted above. The microphone 175 may receive an encoded sound signal and transmit the signal to the console 105. The processor 130 of the console 105 may decode the signal and apply or associate the label to the channel it was received on. The label may then be visible via the console display 155 or the display strip 115. In another embodiment, the label may be transmitted via a signal on the wireless network and received by the receiver of the console 105. Near or at the same time, a user may tap the microphone 175 that is coupled to the input port 140 of the desired channel that is to undergo a label change. The console 105 performs the label change for the input port 140 (or channel) that is coupled to the microphone 175 that receives the tap by the user.

Once a label is associated with the desired channel, the interface 185 may also provide a confirmation message 230 thereon. This message 230 may communicate to the user the channel of the respective label to the user. In the example shown, the message 230 may include "Label created for CH1 Drums." This provides notice to the user that the label was successfully associated with an input/channel on the mixing console 105, and the user may thus continue to label additional channels if desired. The confirmation message 230 may be displayed on the mobile device 110 in response to a wireless confirmation signal. The mobile device 110 may interpret the wireless confirmation signal and provide an appropriate confirmation message 230 to the user.

The confirmation message 230 may also include an error message or warning. In one example, the console 105 may receive the wireless label signal, but may not receive an audio signal from the wire 180 (i.e., tap or other audible sound from the microphone 175) to indicate the input to associate the label with. This may be due to a faulty socket, or if the wire is not completely plugged into the socket. In such a situation, where the console 105 cannot associate a label with a channel, an error message may be displayed via the interface 185. In one example, a generic message may read "No Label Created." In another example, a more specific label may read "Error, no signal received from microphone." Such confirmation messages 230 may be transmitted wirelessly to the mobile device 110 via the confirmation command or signal.

The console 105 may determine that an error has occurred when one or more necessary signals are not received, or if they are received, they are not understandable, distorted, etc. In one example, while the FSK signal (or encoded signal) may be received over the wire 180, the console 105 may have difficulty decoding the signal. Thus, an error may be realized. In another example, similar to the one above, a signal may not be received via the wire 180 within a predefined time of receiving a wireless label signal. It may be common for the wireless label signal and the audio signal transmitted via the wire 180 to be concurrently, or near concurrently transmitted. That is, the user may tap the microphone, and nearly immediately select the apply button 220 to apply the selected label, or vice versa. In one example, the predefined amount of time for receiving the audio signal from the microphone 175 may be sixty (60) seconds. Thus, if both audio and label signals are not received within sixty seconds of each other, an error message may be transmitted by the console 105 to be displayed on the mobile device 110.

While the label mode button 205, an existing label block 210, the new label block 215, apply button 220 and confirmation message 230 are all shown as part of the same interface 185, several interfaces may be used to present customizable information to the user. The user may be able to save labels for future use. Additionally, the user may be able to customize certain settings associated with each instrument at the mobile device 110, as discussed below. Further, the confirmation message 230 may include error messages, in addition to a list of labels currently associated with channels. In addition to the shown buttons, an "Exit label mode" button may also be included. Additional instructions to the user may also be displayed. For example, after the apply button 220 is selected, textual instructions as to how the user should proceed may be displayed. In this example, the interface 185 may display "Hold phone up to microphone, coded sound will commence."

Further, in addition to visual display alerts, audio alerts or notices may also be provided. For example, upon receiving confirmation that the console 105 successfully labeled the channel, the mobile device 110 may instruct a chime-like sound to provide the user an audible confirmation. Additionally or alternatively, the processor 130 may instruct the speakers 170 to indicate a successfully applied label. These audible confirmations could be a chime or other audible signal.

Figure 5:
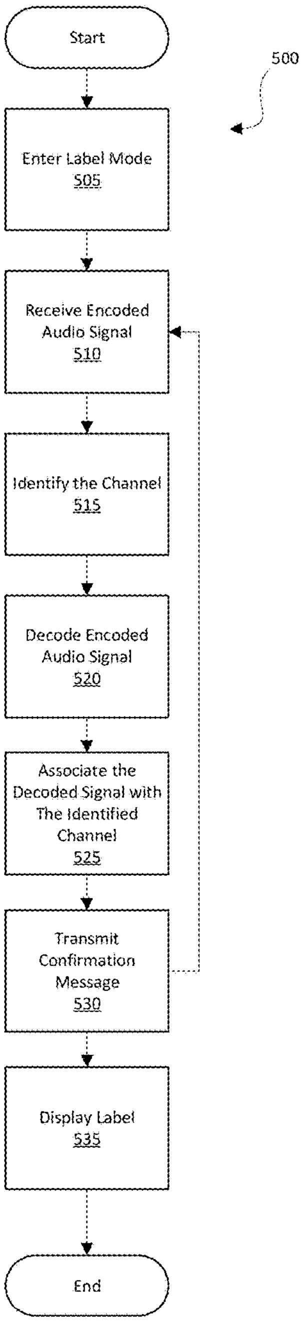
FIG. 5 is a flow chart for assigning the label to a channel of an audio mixing console with an encoded audio signal.

FIG. 5 is a flow chart for the labeling system 100 when the label signal is provided as an encoded audio signal. The process 500 begins at block 505 where the console 105 may receive a command to enter into a label mode. The command may be transmitted over the wireless network from the mobile device 110. The mobile device 110 may then transmit such a command in response to a selection of the label mode button 205 by the user. The process 500 proceeds to block 510.

At block 510, the console 105 may receive the encoded audio signal at the input port 140 via the wire 180. The mobile device 110 enables the user to select a label to be associated with an instrument and channel thereof via the user interface 185. The mobile device 110 may generate an audible sound representing the selected label in response to the label selection. That is, the audio sound generated by the mobile device 110 may be encoded to include data representative of the textual label. The mobile device 110 may generate the audio sound based on the user selection. That is, one encoded signal may be generated in response to a selection of the "Drum" label, while another may be generated in response to a selection of the "Keyboard" label. The device speakers may play the generated audio at the mobile device 110. The microphone 175 may then receive the audio and transmit the encoded signal representing the generated audio to the consoles via the wire 180 at input port 140. As noted above, the encoded signal may be an FSK signal. Once the console 105 receives the encoded audio signal, the process proceeds to block 515.

At block 515, the console 105 may identify the channel associated with the input port 140 based on the channel that receives the encoded signal. The console 105 may recognize which input port 140 the signal was received on. Because the console 105 is in the "label mode," only one input may be received at a time. The process proceeds to block 520.

At block 520, the console 105 may decode the encoded signal. The console 105 may determine an alphabetic character associated with each tone of the signal. The string of alphabetic characters decoded from the signal may form the textual label to be assigned to the channel. Once the console 105 has decoded the encoded signal, the process proceeds to block 525.

At block 525, the console 105 associates the label with the channel as identified in block 515. The process proceeds to block 530.

At block 530, the console 105 may electronically transmit a confirmation signal or command to indicate that the channel has been assigned with the desired label to the mobile device 110. The mobile device 110 may display the confirmation message 230 to the user via the device display 120 in response to the confirmation signal. For example, the confirmation message 230 may include "Label created for CH1: Drums." If the user is unsatisfied with the label and channel associated with it, as indicated by the confirmation message 230, then the user may re-label the channel by starting the process over at block 510. Otherwise, the process proceeds to block 535.

At block 535, the console 105 may instruct the display 120 or label strip to display the label. The process 500 may then end.

In the process 500, both the label and the channel are identified via the encoded audio signal.

Figure 6:
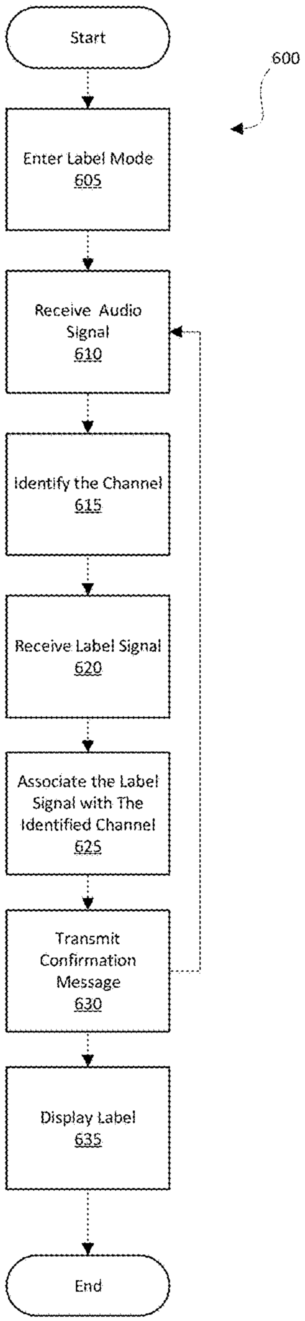
FIG. 6 is a flow chart for assigning the label to a channel of the audio mixing console with a label signal and an audio signal.

FIG. 6 is an example flow chart for the labeling system 100 where the channel is identified by an audio signal and the label is transmitted by a label signal. The process begins at block 605, where similar to block 505, a label mode is entered. At block 610, the console 105 may receive an audio signal from the microphone 175 at the input port 140. The audio signal may represent a noise received at the microphone. For example, the noise may come from the instrument associated with the microphone (e.g., a tap of the drums.) The microphone 175 may also be tapped by the user. In response to the noise, the microphone 175 may then transmit the audio signal over the wire to the input port 140. The process 600 proceeds to block 615.

At block 615, similar to block 515, the console 105 may identify the channel associated with the input port 140 at which the audio signal was received. The process 600 proceeds to block 620.

At block 620, the console 105 may receive the label signal from the mobile device 110. The label signal may be transmitted in response to the user selecting the label at the user interface 185. The process 600 proceeds to block 625.

At block 625, the console 105 may associate the label signal with the identified channel in block 615. The process 600 proceeds to block 630.

At block 630 and similar to block 530, the console 105 may transmit the confirmation message to the mobile device 110. The process 600 proceeds to block 635, where the console 105 may instruct the display 120 or label strip to display the label. The process 600 may then end.

Figure 7:
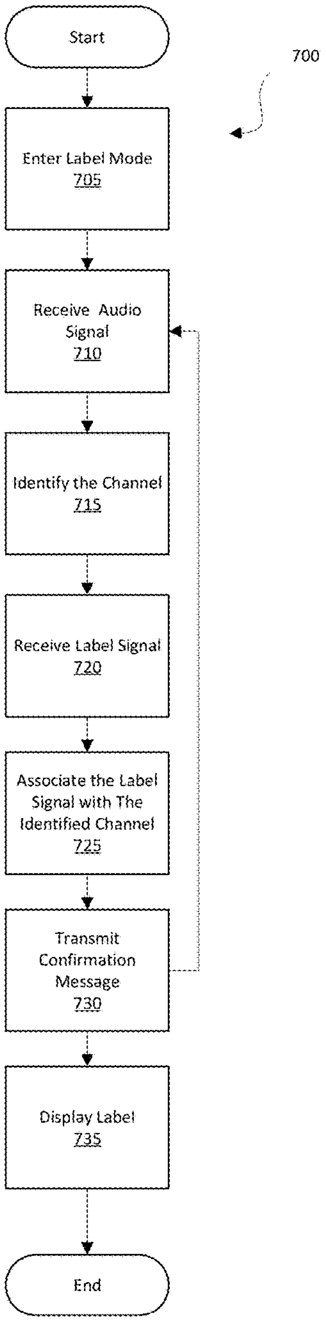
FIG. 7 is a flow chart for assigning the label to a channel of the audio mixing console with a label signal and an audio signal initiated by a mobile device.

FIG. 7 is an example process 700 for executing aspects of the labeling system 100 that is similar to the process 600 of FIG. 6. However, the process 700 differs from the process 600 in that the audio signal may be initiated by the mobile device 110. At step 710, the audio signal may be received at the microphone 175 and transmitted to the console 105 via the wire as described above. The mobile device 110 may generate and emit the audio signal. For example, upon selecting a label at the user interface 185 of the mobile device 110, the mobile device 110 may generate a unique tone at a predetermined frequency such as, for example, a 520 Hz sinusoidal audio frequency tone. This fixed frequency may be known to the console 105 in order for the console to identify the unique tone over other noises including ambient noise. For example, the mobile device 110 may be positioned proximate to the microphone 175 and emit the unique tone. Blocks 705, 715, 720, 725, 730, and 735 may be similar to blocks 605, 615, 620, 625, 630, and 635, respectively.

Figure 8:
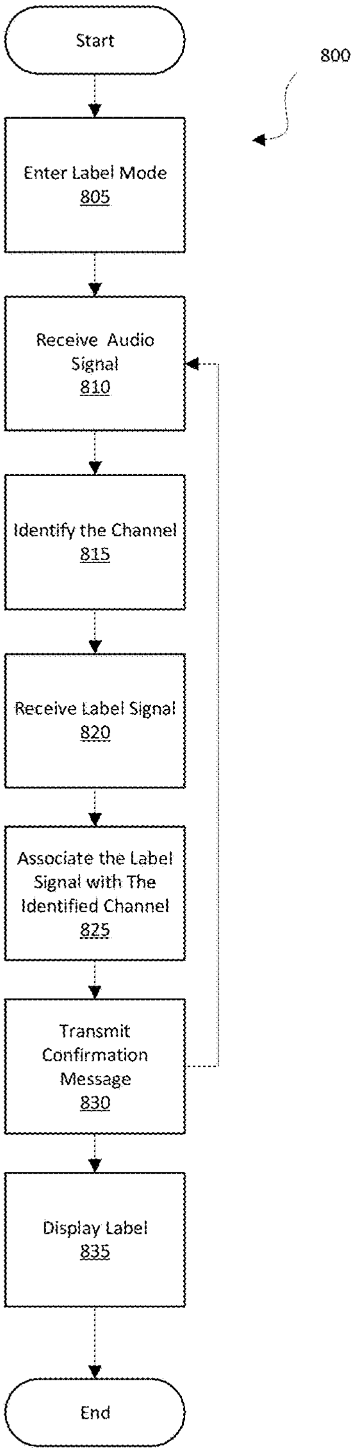
FIG. 8 is a flow chart for assigning a label to the channel of the audio mixing console with a label signal and an audio signal provided by a microphone.

FIG. 8 is an example process 800 for the labeling system 100 that is similar to the process 600 of FIG. 6. However, the process 800 differs from the process 600 in that the audio signal may be initiated by a built-in circuit at the microphone 175. As explained, the microphone 175 may include a circuit capable of transmitting an identification tone over the wire 180. At block 810, the audio signal may be transmitted to the console 105 by activation of a switch on the microphone 175. The microphone 175 may include a radio frequency (RF) switch that, when pressed, would instruct the microphone 175 to emit the identification tone. In block 815, the console 105 identifies the channel to label based on input that received the identification tone.

At block 820, the console 105 then receives the label signal from the mobile device 110 over the wireless network. Additionally or alternatively, the mobile device 110 may generate the label signal and transmit the label signal to the microphone 175. The microphone receiver may receive the audio signal which identifies the label and then transmits the same to the console 105 via the wire 180 or wirelessly. Blocks 805, 825, 830, and 835 are similar to blocks 605, 625, 630, and 635, respectively.

Figure 9:
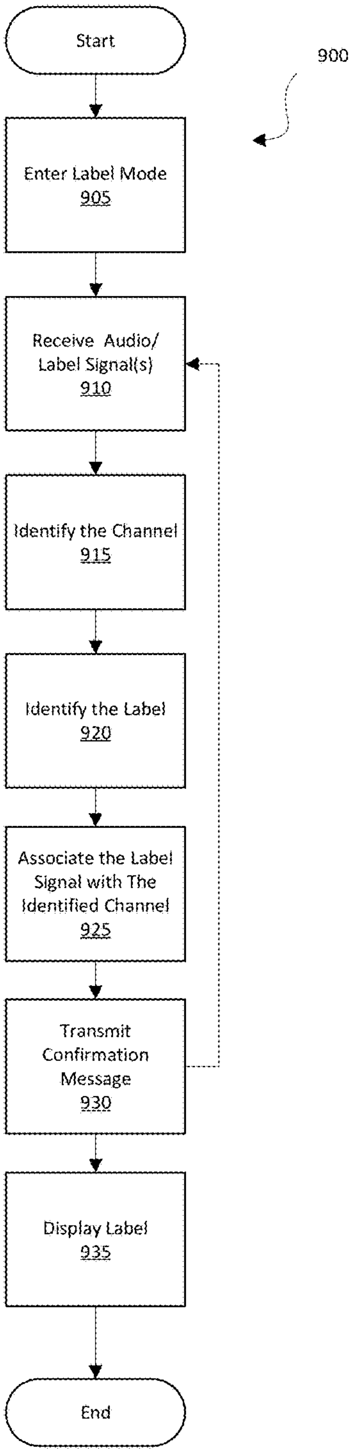
FIG. 9 is a flow chart for generally assigning the label to the channel of the audio mixing console.

FIG. 9 is an example general flow chart for executing aspects of the labeling system encompassing the above processes, including receiving the label signal wirelessly, as well as at the input port 140 via the wire 180. The process 900 begins at block 905 where the console 105 may receive a command to enter into the label mode. The mobile device 110 may transmit the command over the wireless network. The mobile device 110 transmits the command in response to selection of the label mode button 205 on the user interface 185 of the mobile device 110. The process 900 proceeds to block 910.

At block 910, the console 105 may receive one or more signals, such as the audio signal. At least one signal may be received at the input port 140 via the wire 180 associated with the microphone 175 and instrument device 145. As explained, this signal may be an audio signal and may be used to identify the channel/input port for which the user wishes to label. The signal may be indicative of a sound or audio string being received at the microphone 175. For example, a coded audio sound emitting from the speaker of the mobile device (e.g., the FSK signal) may be received by the microphone 175. The signal may also be initiated by the user tapping on the microphone to create an impulse audio signal. Additionally or alternatively, the instrument device 145 may create a sound that is picked up by the microphone. By receiving an audio sound at the microphone 175, an audio signal may be transmitted over the wire 180 and received by the console 105.

In addition to receiving the audio signal at the console 105, the console 105 may also receive the label signal from the mobile device 110. This label signal may be transmitted via the wireless network to the console 105 and may include the textual label to be associated with the channel. This additional signal may be received when the audio signal itself does not identify a label (e.g., a non-coded audio signal such as a microphone tap or sound from an instrument). That is, the mobile device 110 may transmit the textual label when the audio signal form the microphone 175 does not include such information. This may be the case when the microphone picks up a non-coded signal such as a tap or instrument sound. In the event that a FSK signal is transmitted, or a signal from a microphone identification circuit is transmitted, the textual label information may be included in the audio signal transmitted via the wire and no additional information (e.g., label signal from the mobile device 110) is necessary.

Once the signal or signals have been received, the process 900 proceeds to block 915.

At block 915, the console 105 may identify the channel associated with the input port 140 at which the audio signal was received. The process 900 may proceed to block 920 where the label may be identified. In the example where a coded audio signal was received, the console 105 may decode the audio signal to identify the label. The console 105 may also receive a wireless label signal and identify a label within the label signal.

At block 925, the label is associated with the channel identified in block 915. The process 900 proceeds to block 930.

At block 930, console 105 may transmit a confirmation message indicating the label to the mobile device 110. The confirmation message may be recognized by the mobile device 110 and displayed to the user via the device display 120. While the confirmation message may identify a channel and the label associated therewith, it may also indicate a warning that not enough information was received to label the channel. For example, an audio signal may be received but a label signal may not. The console 105 may check for the label signal for a predefined amount of time (e.g., 60 seconds). If a label signal is not received within that time, the error message may be sent. Additionally, further details may be provided in the confirmation message such as "Wireless Network not detected," or "Multiple label signals received."

At block 935, the console 105 may display the label. The process 900 may then end.

Thus, a console 105 may receive signals from one or both of the microphone 175 and the mobile device 110. These signals may indicate a label to be associated with the channel of the input port 140 connected to the microphone 175. These signals may be received as outlined in processes 500, 600, 700 and 800, above.

Although not depicted in FIGS. 5-9, the mobile device 110 may also perform a similar process. Additionally or alternatively, the mobile device 110 may also be configured to receive a user selected mode initiation (e.g., selecting the label mode button). In response to this, a mode command may be transmitted to the processor 130 so as to ready the processor 130 to receive various labeling signals. The mobile device 110 may then receive a user selected label when the user selects from either an existing label, or creates a new one via the interface 185, as shown in FIG. 4. The selected label may then be transmitted to the processor 130. Once the processor 130 associates the label with the appropriate channel, the mobile device 110 may receive a confirmation message indicating which channel is associated with the selected label.

Figure 10:
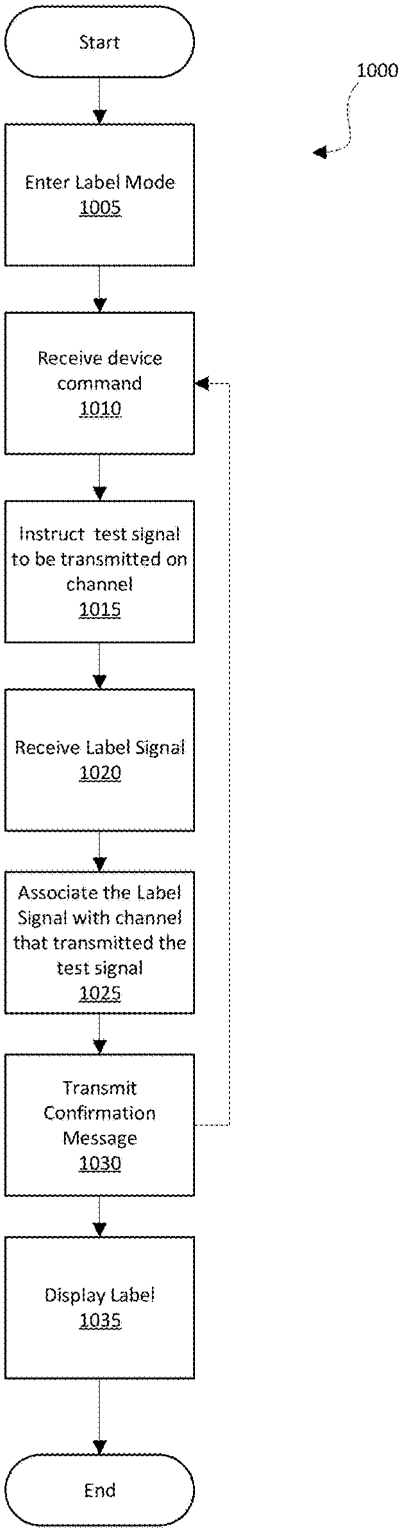
FIG. 10 is a flow chart for another labeling system for assigning the label to a channel of the audio mixing console.

Additionally or alternatively, the system may permit labeling of mixing console output channels from the mobile device 110 by identifying an output or playback device (e.g., speaker 170, or other device 145). FIG. 10 is a flow chart for another labeling system where an output channel may be labeled based on a received device command and a received label. The mobile device 110 may transmit a command to the console 105. The command may be a test command instructing the console 105 to transmit a test signal over a certain channel. The test signal may be transmitted over the wire

195 plugged into that channel. The speaker 170 may receive the test signal and emit a sound in response. When the sound is emitted, the user at the mobile device 110 may then recognize what type speaker 170 or other output devices the sound was emitted from. Upon this realization, the user may select or input a label at the mobile device 110. Once selected, the label may be transmitted to the console 105 to label the channel accordingly.

The process may begin at block 1005 where the console 105 may receive a command to enter into the label mode. The mobile device 110 may transmit the command over the wireless network.

At block 1010, the console 105 may receive a device command. This command may be a test command instructing the console to transmit a test signal. The test command may identify a specific channel for which the test signal is to be transmitted. Additionally or alternatively, the console 105 may select the channel based on whether or not a wire 180 is currently plugged in to a channel.

At block 1015, the console 105 may transmit a test signal over a wire 180 at the respective port 140. The test signal may be an audio signal to be emitted from a speaker 170. The audio signal may include at least one tone to be played at the monitor or speaker 170 so that a user may hear the tone and in turn identify the speaker 170.

At block 1020, the console 105 may receive a label signal. This label signal may be transmitted via the wireless network to the console 105 and may include the textual label to be associated with the channel. The label may be selected by the user via the mobile device 110 based on the tone realized at the speaker 170. For example, if a left speaker on a stage plays a sound based on the test signal, the user at the mobile device 110 may select "Left Speaker" as the label to be associated with the channel of the speaker. Similar to the example shown in FIG. 4, labels may be selected via the interface 185 where a user may select from a list of existing labels, and/or create a new custom label.

At block 1025, once the label signal is received from the mobile device 110, the console 105 may associate the label with the channel that the test signal was transmitted on.

At block 1030, the console 105 may transmit a confirmation message indicating the label to the mobile device 110. This may be done via the interface 185, or via another mechanism such as an audible tone or message, vibrations at the mobile device 110, etc. If the user does not receive a confirmation message, or if the message indicates that there is an error, the mobile device 110 may transmit another command at block 1010.

At block 1035, the console 105 may display the label. The process 1000 may then end.

Process 1000 may aid in channel labeling of larger systems having several stage monitors or speakers and subwoofers, etc. Further, knowing what speaker 170 is being used for what purpose, the process may aid in better control of the output. For example, it may not be important that a certain speaker is connected at a specific channel, but that the speaker is associated with a certain instrument. In the case where a speaker is connected to a guitar, it may be labeled "guitar monitor".

In addition to providing labels for certain channels for the mixing console 105, the mobile device 110 may also provide specific settings or parameters for each channel. The specific settings may include instrument specific settings and instrument or speaker parameters that can be generated, saved and recalled at the mobile device 110. These settings may be maintained in a database within the device 110, or within the database at the console 105. These settings may be customizable by the user. For example, the mobile device 110 may provide interfaces that permit the user to set certain configurations for drums. These configurations may include equalizer and filter settings and limits, as well as other configurations typical to a mixing system such as input gains. The configurations may also include speaker parameters such as gain, volume, equalization, sample rates, cut-off frequencies, etc.

Figure 11:
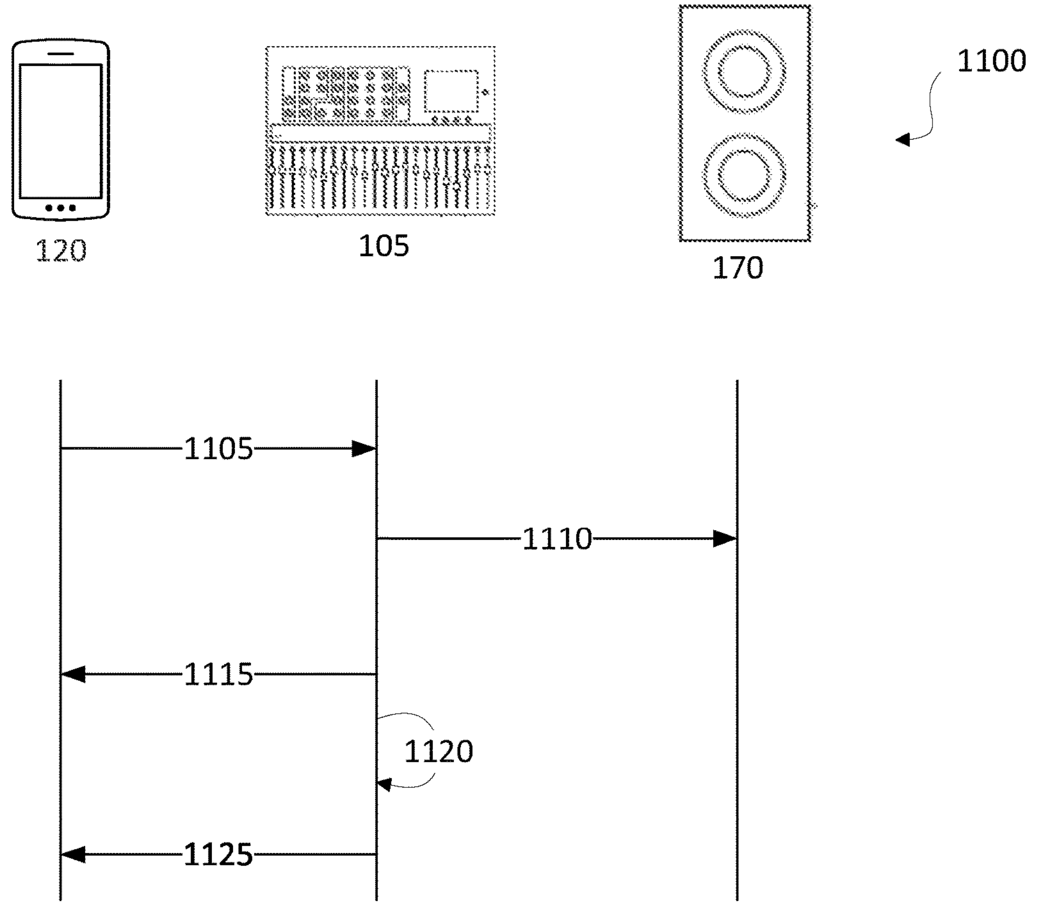
FIG. 11 is a process flow for the labeling system of FIG. 10.

FIG. 11 illustrates an example process flow 1100 for the process 1000 of FIG. 10. At 1105, the mobile device 110 may transmit a signal to the console 105 indicating that the console 105 is to enter into the label mode. The console 105, upon receiving the command to enter into the label mode, may transmit a test signal via a port 140 associate with a channel to one of the speakers 170 at 1110. Upon hearing audio emissions from the respective speaker 170 as a result of the test signal, the user at the mobile device 110 may select a label via the interface 185. The mobile device 110 may transmit the selected label via the wireless network to the console 105 at 1115. The console may then associate the label with the channel at 1120. The console 105 may then wirelessly transmit a confirmation message to the mobile device 110 at 1125. The process flow 1100 may be repeated until each of the channels associated with a speaker 170 are labeled. The console display 155 may be updated to reflect to the labels.

Accordingly, by interfacing with the mobile device, the console may implement an efficient, reliable, and easy to use labeling system for labeling the console channels.

Computing devices, such as the console 105, mobile device 110, computing device 125, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

What is claimed is:

1. An apparatus for labeling inputs at an audio mixer, the apparatus, comprising:

an audio mixer console including a processor and being configured to:

receive a test command from a display of a mobile device;

transmit, from a port, an audio signal to a playback device, the port being associated with a channel of the audio mixing console;

receive a label signal including a channel label to be assigned to the channel in response to a user input at the mobile device, the label signal received wirelessly from the mobile device; and assign the channel label to the channel in response to the label signal.

2. The apparatus of claim 1, wherein the audio mixing console is further configured to transmit a confirmation message to the mobile device in response to assigning the channel label to the channel.

3. The apparatus of claim 2, wherein the confirmation message provides an electronic indication that the channel label has been assigned to the channel.

4. The apparatus of claim 2, wherein the audio mixing console is further configured to transmit an error message to the mobile device in response to the channel label not being assigned to the channel.

5. The apparatus of claim 1, wherein the label signal includes at least one textual string associated with the playback device, wherein the at least one textual string provides information related to one or more speakers.

6. The apparatus of claim 1, wherein the audio mixing console is further configured to apply a speaker parameter to a speaker in response to associating the channel with the channel label.

7. The apparatus of claim 6, wherein the speaker parameter includes at least one of gain, volume, and equalization settings.

8. The apparatus of claim 1, wherein the audio mixing console is further configured to enter and to exit a label mode in response to receiving a label mode signal from the mobile device.

9. The apparatus of claim 1, wherein the audio mixing console is further configured to operate in one of a normal mode to mix audio inputs that are received at the audio mixing console and in a label mode to assign the channel with the channel label, and wherein the audio mixing console is further configured to deactivate mixing any number of the audio inputs that are received at the audio mixing console while in the label mode.

10. A computer-program product embodied in a non-transitory computer-readable medium that is programmed for labeling inputs of an audio mixer, the computer program product comprising instruction for:

electrically receiving a first user input that is indicative of a command for an audio mixing console to enter into a label mode to enable a channel on the audio mixing console to be associated with a label;

transmitting a mode command to the audio mixing console in response to the first user input;

receiving a second user input that identifies the label to be assigned to the channel on the audio mixing console;

transmitting a label message that identifies the label to be assigned to the channel to the audio mixing console in response to the second user input; and displaying a confirmation message at a display of a remote device in response to assigning the label to the channel.

11. The computer-program product of claim 10, wherein the confirmation messages provides an electronic indication that the label has been assigned to the channel.

12. The computer-program product of claim 10, further comprising instructions for displaying an error message in response to the label not being assigned to the channel.

13. The computer-program product of claim 10, wherein the label identified by the second user input corresponds to at least one of a list of pre-selected labels and a new label.

14. An apparatus for labeling inputs at an audio mixer, comprising:

a mobile device including a processor being programmed to:

electrically receive a first user input that indicates a command for an audio mixing console to enter into a label mode to enable a channel on the audio mixing console to be associated with a label;

transmit a mode command to the audio mixing console in response to the first user input;

receive a second user input that identifies the label to be assigned to the channel on the audio mixing console; and transmit a label message that identifies the label to be assigned to the channel to the audio mixing console in response to the second user input; and display a confirmation message at a display of a remote device in response to assigning the label to the channel.

15. The apparatus of claim 14, wherein the confirmation message provides an electronic indication that the label has been assigned to the channel.

16. The apparatus of claim 14, wherein the mobile device is further programmed to display an error message in response to the label not being assigned to the channel.

17. The apparatus of claim 14, wherein the label identified by the second user input corresponds to at least one of a list of pre-selected labels and a new label.

* * * * *